J. C. HICKS.
Harvester Rake.

No. 15,237.

Patented July 1, 1856.

UNITED STATES PATENT OFFICE.

JOHN C. HICKS, OF ROCKAWAY, NEW YORK.

IMPROVEMENT IN RAKING ATTACHMENTS FOR REAPERS.

Specification forming part of Letters Patent No. 15,237, dated July 1, 1856.

*To all whom it may concern:*

Be it known that I, JOHN C. HICKS, of Rockaway, in the county of Queens and State of New York, have invented a new and Improved Raking Attachment to be Applied to Reapers; and I do hereby declare that the following is a full, clear, and exact description of the same, reference being had to the annexed drawings, making a part of this specification, in which—

Figure 1:
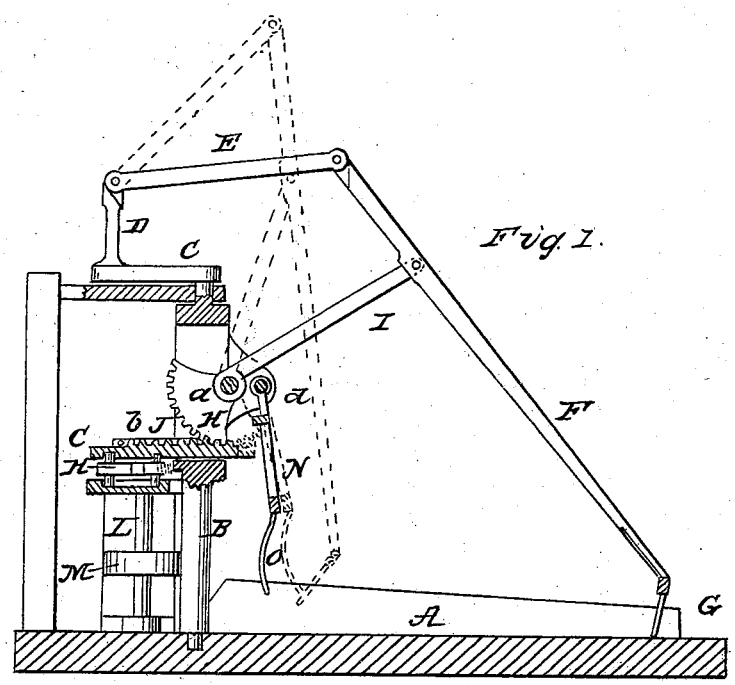
Figure 2:
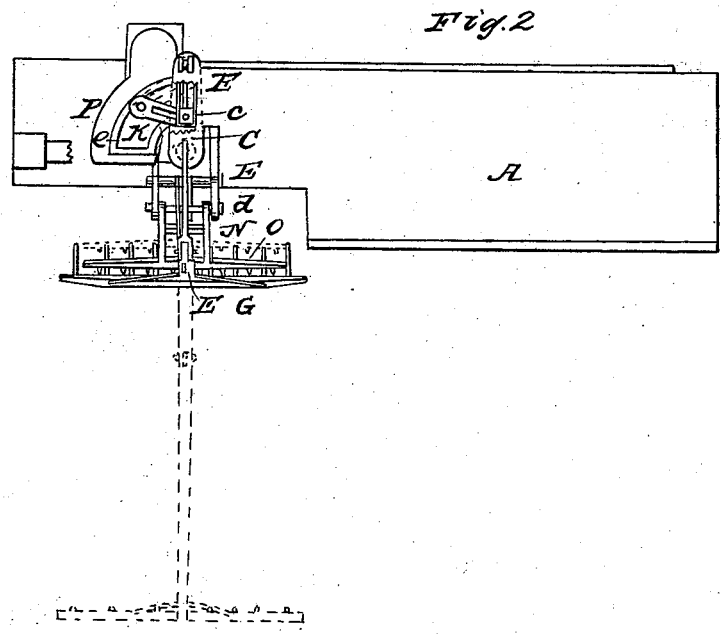

Figure 1 is a side view of my improvement. Fig. 2 is a plan or top view of the same.

Similar letters of reference indicate corresponding parts in the two figures.

My invention consists in the peculiar means employed for operating the rake, whereby said rake is drawn over the platform of the reaper, turned around and thrown outward therefrom, and turned to the outer end of the platform to be again drawn inward or over the platform, the rake having a motion communicated to it similar to that given by hand.

To enable those skilled in the art to fully understand and construct my invention, I will proceed to describe it.

A represents the platform of a reaper, and B represents a vertical shaft, which is properly secured at the inner end of the platform, said shaft being allowed to turn in its bearings.

To the upper end of the shaft B there is attached a crank, C, which has a vertical rod or bar, D, attached to its outer end.

To the upper end of the rod D a bar, E, is pivoted, and the upper end of a rake-bar, F, is pivoted to the outer end of the bar E, the rake G being attached to the lower end of the bar E.

H represents a geared sector, the axis *a* of which is fitted in the vertical shaft B. To one end of the sector H a rod, I, is attached, the outer end of the rod being pivoted to the rake-bar F. The sector H gears into a rack, J, which is fitted horizontally between guides *b*, attached to or fitted in the shaft B. One end of this rack has a pin, *c*, attached to it, said pin being fitted in a slotted crank or arm, K, attached to the upper end of a shaft, L, having a driving-pulley, M, upon it.

To the shaft B a frame, N, is attached, the upper end of the frame working on a rod, *d*, in the shaft. The lower end of the frame N has a holding-rake, O, attached to it. The lower end of the pin *c* works in a groove, *e*, cut in a platform, P, adjoining the shaft B, as plainly shown in Fig. 2.

The operation will be readily understood. The shaft L is rotated in any proper manner from the driving-wheel of the machine, and as the crank or arm K rotates the rack J will be moved back and forth. When the rack is forced outward the rake G will be drawn inward over the platform A, and the grain will be clasped between the rake G and holding-rake O, the two rakes being in the position as shown in red, Fig. 1. The crank or arm K will then turn the rack J and shaft B, with the two rakes G O, around, so that the rakes will be off from the platform. The crank or arm then draws the rack J inward, and the rake G is thrown outward, as shown in red, Fig. 2, the grain falling from between the two rakes upon the ground. The rake G, when thus extended, is turned around, the crank or arm K again turning the shaft B, and the rake G is drawn inward as before. The rake O is thrown a trifling distance forward by the action of the sector H, so as to meet the rake G as it is drawn inward, and it will be seen that shaft B is turned at the termination of each stroke or vibration of the rack J.

The above improvement is extremely simple, the rake G being operated by a device formed of a few parts, which may be made at a small expense, and without being liable to get out of repair.

I am aware that a similar motion has previously been given a rake for effecting the same purpose as herein shown; but a complicated and expensive device was employed for operating the rake, the device enhancing, to a great extent, the cost of the reaper.

Having thus described my invention, I do not claim the general construction and operation of the above-described raking attachment, for I am aware that the same has been accomplished before; but

What I claim as new, and desire to secure by Letters Patent, is—

Operating the rakes G and O by means of the segment H and rack J, with pin *c* attached, in combination with slotted arm or crank K and groove *e* in platform P, when arranged and operated in the manner and for the purpose set forth.

JOHN C. HICKS.

Witnesses:
HENRY PEARSALL,
RICHD. HICKS.